United States Patent [19]

Reed

[11] 3,961,410

[45] June 8, 1976

[54] MASONRY ANCHOR EXTRACTOR TOOL

[76] Inventor: Donald K. Reed, 2700 Highway 1, Sp. 28, Oceano, Calif. 93445

[22] Filed: Oct. 7, 1974

[21] Appl. No.: 478,516

[52] U.S. Cl. .................................... 29/256; 29/282

[51] Int. Cl.[2] .......................................... B23P 19/04

[58] Field of Search ............. 29/256, 263, 264, 282, 29/427; 85/68

[56] References Cited

UNITED STATES PATENTS

| | | | |
|---|---|---|---|
| 1,381,101 | 6/1921 | Albertson | 29/427 |
| 1,382,835 | 6/1921 | Johnson | 29/427 |
| 1,496,134 | 6/1924 | Rumgay | 29/427 |
| 2,305,076 | 12/1942 | Grahm | 29/263 |
| 3,096,574 | 7/1963 | Hillberg | 29/263 |
| 3,200,692 | 8/1965 | Catlin | 85/68 |
| 3,279,301 | 10/1966 | Fischer | 85/68 |

*Primary Examiner*—James L. Jones, Jr.
*Attorney, Agent, or Firm*—James E. Hawes

[57] ABSTRACT

The disclosed extractor tool cleanly and easily removes "Phillips" anchors and similar elements previously installed in masonry walls. First an inner bolt of the tool is threaded into the installed anchor sufficiently to separate the anchor from its expander plug. Then a nut about the inner bolt is turned, bearing on an outer collar to withdraw the bolt and the attached anchor from the wall.

7 Claims, 2 Drawing Figures

MASONRY ANCHOR EXTRACTOR TOOL

INTRODUCTION

The invention provides an extractor tool for cleanly and easily removing "Phillips" anchors and similar elements from masonry walls and the like.

Masonry anchors, such as the well-known "Phillips" anchor, are in wide use today for they permit heavy loads to be easily attached to walls or other structures of concrete, masonry, or stone and the like (hereinafter collectively referred to as "masonry"). For example, pipes, steam fittings, duct work and other building components routinely are attached to building structures with such anchors. At times it is necessary to remove these anchors because of errors made in their location, because the components they support are to be relocated, or because nuclear power plant contracts often so require, or for a variety of other reasons. However it is no simple matter to retract a masonry anchor once it has been firmly set in a masonry structure. They are designed primarily to resist withdrawal, and brute force attempts to remove them often result in a sizeable chunk of the masonry structure being removed as well.

SUMMARY

The present invention provides an extraction tool for cleanly and easily removing an installed masonry anchor or the like. The tool consists of a threaded inner bolt passing through an elongated collar element, a nut being threaded about the bolt and positioned between the head of the bolt and the outer end of the collar. To remove a previously installed anchor using this tool, first the inner bolt is threaded into the anchor sufficiently to separate the anchor from its expander plug, the threading operation providing a simple but effective means for achieving this separation. Then the nut about the inner bolt is turned down, bearing on the outer collar which in turn bears on the masonry structure. This operation pulls the bolt and the anchor now threaded about it from the structure. Thus, the tool provides a simple yet positive mechanism for cleanly and easily removing masonry anchors from structures in which they had been installed.

BRIEF DESCRIPTION OF THE DRAWINGS

The preferred embodiment of the invention is illustrated in the accompanying drawings in which.

DESCRIPTION OF THE PREFERRED EMBODIMENT

The typical masonry anchor, such as a "Phillips" anchor, consists of a cylindrical member which is forced into a properly sized cavity previously drilled in a masonry structure. To install such an anchor, first an expander plug is set in the cavity then the cylindrical anchor placed over it and driven into the cavity. As the anchor completes its travel into the cavity, inner leg sections of the anchor are forced outwardly by the expander plug thereby firmly wedging the anchor into the cavity. A bolt may be threaded into the installed anchor to attach any desired member to the masonry structure. Often such anchors are self-drilling, the inner edge of the cylindrical member being hardened and shaped to form its own properly sized cavity in the masonry structure.

Figure 1:
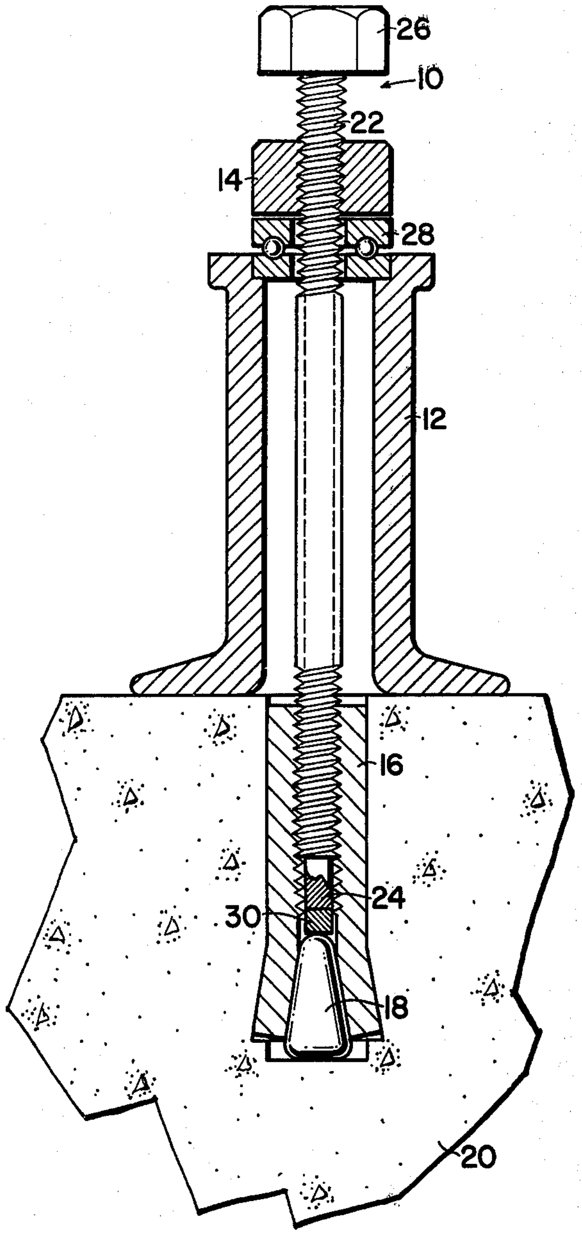
FIG. 1 is a vertical cross-sectional view of the extractor tool threaded into an installed masonry anchor.

The preferred embodiment of the extraction tool is illustrated in FIG. 1. The tool in this embodiment includes three main elements, a bolt 10, a collar 12 extending about the bolt, and a nut 14 threaded about the bolt and positioned between the head of the bolt and the end of the collar. To remove a masonry anchor 16 and its expander plug 18 previously installed in a structure 20, using the extractor tool the threaded shaft 22 of the bolt is screwed into the masonry anchor, the threaded inner surface of the masonry anchor mating with the threads on the bolt shaft as shown in FIG. 1. The bolt shaft has a tip portion 24 that is narrowed to provide a stud which, as the bolt completes its travel into the anchor, bears on the nose of the conical expander plug 18. Further rotation of the bolt by applying torque to its head 26 using a wrench causes the stud to force the expander plug and the anchor apart from one another, the bolt threads cooperating with those of the anchor to draw the anchor from the cavity and axially separate the anchor and its plug.

Figure 2:
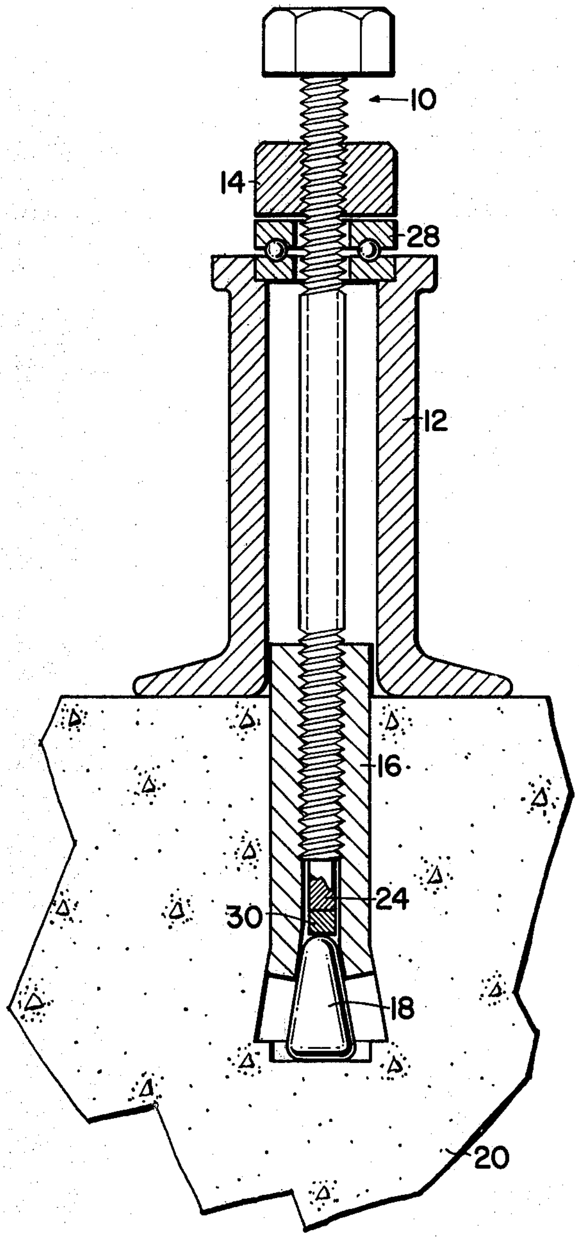
FIG. 2 is a vertical cross-sectional view of the extractor tool in the process of removing the masonry anchor and plug from the masonry structure.

Once the anchor is separated from the plug in this manner, nut 14 is threaded down about the bolt shaft to bear on the outer end of collar 12. Turning nut 14 further forces the bolt shaft outwardly away from the structure and pulls the anchor from the cavity in which it had been installed. The inner diameter of the collar is large enough to permit the anchor to enter the collar as it is pulled from the cavity, as shown in FIG. 2. This simple operation is all that is necessary to remove an installed masonry anchor using the extractor tool. It can be accomplished quickly and easily by anyone without much training and without damaging the adjacent surface of the structure.

Preferably the collar incorporates a bearing 28 at its end adjacent the nut to permit the nut to turn freely while exerting substantial force on the collar. Without such a bearing, repeated use of the tool would abrade the adjacent surfaces of the nut and collar against one another, quickly wearing them down. The bearing 28 prevents this in a simple, effective manner. Also, preferably the bearing is integral with both the collar 12 and nut 14 to interconnect all the components of the tool as a single unit.

Preferably the bolt is magnitized, or incorporates at the tip of stud 24 a magnetic element 30, to magnetically attract and hold the expander plug (typically formed of hardened steel) and to removed it from the cavity simultaneously with the anchor.

Preferably the foot portion of the collar 12 which bears on the masonry structure is enlarged as shown in the accompanying drawings to distribute the pressure exerted on the structure over a large area as the masonry anchor is being removed.

While the preferred embodiment of the invention has been described, it should be understood that various modifications are possible. Accordingly the scope of the invention is defined in the following claims.

I claim:

1. An extractor tool to remove a masonry anchor or the like from a cavity in a masonry structure, the masonry anchor including a cylindrical anchor with internal threads, the anchor when installed being wedged into the side walls of the cavity by an expander plug seated in the cavity, the extractor tool including means to axially separate the anchor from its expander plug, said means including a bolt with a threaded shaft for mating with the inernal threads in the cylindrical anchor, the bolt shaft having a reduced outer end to provide a stud portion, the stud forcing the expander plug from the cylindrical anchor as the shaft is threaded into the cylindrical anchor and means to extract the separated anchor from the cavity, said extracting means including a collar member about the bolt and a nut threaded onto the bolt shaft and positioned between the bolt and the end of the collar member whereby when the bolt shaft is threaded into an anchor, the nut may be screwed down to bear on the collar, the collar in turn bearing on the masonry structure and exerting sufficient force as the nut is turned to withdraw the anchor.

2. An extractor tool as set forth in claim 1 including magnetic means to extract the expander plug with the anchor.

3. An extractor tool as set forth in claim 1 in which the extracting means includes a collar member about the bolt and a nut threaded onto the bolt shaft in position between the bolt and the end of the collar member whereby when the bolt shaft is threaded into an anchor, the nut may be screwed down to bear on the collar, the collar in turn bearing on the masonry structure and exerting sufficient force as the nut is turned to withdraw the anchor.

4. An extractor tool as set forth in claim 1 including bearing means between the nut and the adjacent end of the collar to permit free rotation of the nut against the end of the collar.

5. An extractor tool as set forth in claim 4 in which the nut and the collar are integral with the bearing means to interconnect all the components of the tool as a single unit.

6. An extractor tool as set forth in claim 3 in which the collar is cylindrical, the inner diameter of the collar being sufficient to receive the anchor as it is being extracted.

7. An extractor tool as set forth in claim 6 in which the end of the collar adjacent the slab is substantially enlarged to distribute the bearing force as the anchor is extracted over a substantial area of the masonry structure.

* * * * *